US012372271B2

(12) United States Patent
Liu

(10) Patent No.: US 12,372,271 B2
(45) Date of Patent: Jul. 29, 2025

(54) PTC HEATER

(71) Applicant: BESTWAY INFLATABLES & MATERIAL CORP., Shanghai (CN)

(72) Inventor: Feng Liu, Shanghai (CN)

(73) Assignee: BESTWAY INFLATABLES & MATERIALS CORP., Shanghai (CN)

(*) Notice: Subject to any disclaimer, the term of this patent is extended or adjusted under 35 U.S.C. 154(b) by 0 days.

(21) Appl. No.: 17/235,378

(22) Filed: Apr. 20, 2021

(65) Prior Publication Data

US 2021/0239359 A1 Aug. 5, 2021

Related U.S. Application Data

(63) Continuation of application No. 15/698,776, filed on Sep. 8, 2017, now Pat. No. 11,002,465, which is a (Continued)

(30) Foreign Application Priority Data

Sep. 24, 2014 (CN) ........................ 201420552731.2

(51) Int. Cl.

*F24H 1/10* (2022.01)
*F24H 1/12* (2022.01)

(Continued)

(52) U.S. Cl.

CPC ............. *F24H 1/102* (2013.01); *F24H 1/121* (2013.01); *F24H 9/0015* (2013.01); *F24H 9/146* (2013.01);

(Continued)

(58) Field of Classification Search

None

See application file for complete search history.

(56) References Cited

U.S. PATENT DOCUMENTS 1,820,458 A * 8/1931 Jenkins .................. F24H 1/121 392/484
1,978,690 A * 10/1934 Peterson ................ F24H 1/102 392/484

(Continued)

FOREIGN PATENT DOCUMENTS

CN 2362307 2/2000
CN 2606296 3/2004

(Continued)

OTHER PUBLICATIONS

Extended European Search Report dated Apr. 1, 2016 (Apr. 1, 2016) issued on related European Patent Application 1565340.9 by the European Patent Office.

(Continued)

*Primary Examiner* — Thor S Campbell
(74) *Attorney, Agent, or Firm* — DICKINSON WRIGHT PLLC

(57) ABSTRACT

A heating apparatus is disclosed. The heating apparatus comprises a PTC heating element, a first electrode, a second electrode, a first protection layer, a second protection layer, a first interlayer, and a second interlayer. A hardness of the first protection layer is greater than that of the first interlayer. A hardness of the second protection layer is greater than that of the second interlayer.

16 Claims, 13 Drawing Sheets

Related U.S. Application Data continuation-in-part of application No. 15/414,190, filed on Jan. 24, 2017, now Pat. No. 10,228,158, which is a continuation of application No. 14/676, 665, filed on Apr. 1, 2015, now Pat. No. 9,618,230.

(51) Int. Cl.

| | |
|---|---|
| ***F24H 9/00*** | (2022.01) |
| ***F24H 9/14*** | (2006.01) |
| ***F24H 9/1818*** | (2022.01) |
| ***H05B 3/04*** | (2006.01) |
| ***H05B 3/06*** | (2006.01) |
| ***H05B 3/44*** | (2006.01) |

(52) U.S. Cl.

CPC ............. *F24H 9/1827* (2013.01); *H05B 3/04* (2013.01); *H05B 3/06* (2013.01); *H05B 3/44* (2013.01); *H05B 2203/016* (2013.01); *H05B 2203/02* (2013.01); *H05B 2203/021* (2013.01)

(56) References Cited

U.S. PATENT DOCUMENTS

| | | | | |
|---|---|---|---|---|
| 2,419,429 | A * | 4/1947 | Voiles | F24H 1/103 392/486 |
| 3,782,456 | A * | 1/1974 | Gusmer | F28F 7/02 165/83 |
| 4,032,751 | A * | 6/1977 | Youtsey | H05B 3/146 338/211 |
| 4,230,935 | A * | 10/1980 | Meixner | H05B 3/80 219/544 |
| 4,255,646 | A * | 3/1981 | Dragoy | F17C 7/04 137/341 |
| 4,334,141 | A * | 6/1982 | Roller | A47J 31/545 219/505 |
| 4,371,777 | A * | 2/1983 | Roller | H05B 3/14 219/505 |
| 4,395,618 | A * | 7/1983 | Cunningham | F24H 1/102 392/492 |
| 4,395,623 | A * | 7/1983 | Shimada | H05B 3/141 219/505 |
| 4,501,952 | A * | 2/1985 | Lehrke | B05B 7/1693 165/184 |
| 4,822,980 | A * | 4/1989 | Carbone | H05B 3/141 219/205 |
| 4,922,083 | A * | 5/1990 | Springs | H05B 3/56 219/549 |
| 5,257,341 | A * | 10/1993 | Austin, Jr. | F24H 1/142 433/32 |
| 5,438,642 | A * | 8/1995 | Posen | H05B 3/82 392/491 |
| 5,504,307 | A * | 4/1996 | Hayashi | C23C 28/325 219/535 |
| 5,513,296 | A | 4/1996 | Goldstein | |
| 5,724,478 | A * | 3/1998 | Thweatt | F24H 1/142 219/535 |
| 5,930,458 | A | 7/1999 | Yane et al. | |
| 6,093,909 | A | 7/2000 | Beetz et al. | |
| 6,180,930 | B1 * | 1/2001 | Wu | H05B 3/50 219/535 |
| 6,236,810 | B1 * | 5/2001 | Kadotani | H01L 35/00 392/483 |
| 6,330,395 | B1 * | 12/2001 | Wu | H05B 3/283 392/494 |
| 6,330,695 | B1 | 12/2001 | Arai | |
| 6,442,341 | B1 * | 8/2002 | Wu | F24H 1/142 392/479 |
| 6,459,854 | B1 * | 10/2002 | Yoakim | F24H 1/142 392/479 |
| 6,762,396 | B2 * | 7/2004 | Abbott | H05B 3/141 118/724 |
| 7,046,922 | B1 * | 5/2006 | Sturm | F24H 9/2028 392/482 |
| 7,088,915 | B1 * | 8/2006 | Sturm | F24H 1/102 392/482 |
| 7,106,957 | B2 * | 9/2006 | Abras | F28F 21/062 392/480 |
| 7,248,792 | B2 * | 7/2007 | Mihara | A61C 1/0069 392/492 |
| 7,424,211 | B2 * | 9/2008 | Lehmann | H05B 3/82 392/314 |
| 7,813,628 | B2 * | 10/2010 | Haan | F22B 1/288 392/397 |
| 7,822,326 | B2 * | 10/2010 | Commette | F24H 1/102 392/484 |
| 7,865,073 | B2 * | 1/2011 | Von Der Luhe | A47J 31/542 99/279 |
| 8,170,406 | B2 * | 5/2012 | Wu | F24H 9/1827 392/467 |
| 8,431,874 | B2 | 4/2013 | Oh et al. | |
| 8,569,663 | B2 | 10/2013 | Qin et al. | |
| 8,577,211 | B2 * | 11/2013 | Lucker | F24H 9/2028 411/533 |
| 2001/0003336 | A1 * | 6/2001 | Abbott | F27D 11/02 118/724 |
| 2011/0280554 | A1 | 11/2011 | Schlipf | |
| 2013/0163969 | A1 * | 6/2013 | Bohlender | F24H 3/062 392/465 |
| 2013/0186966 | A1 * | 7/2013 | Taguchi | H05B 3/24 392/496 |
| 2014/0050466 | A1 * | 2/2014 | Giffels | H05B 3/22 392/491 |
| 2014/0086566 | A1 * | 3/2014 | Waechter | F24H 1/102 392/479 |
| 2016/0054029 | A1 * | 2/2016 | Carlens | H05B 3/20 392/489 |
| 2017/0130991 | A1 | 5/2017 | Liu | |
| 2021/0239359 | A1 * | 8/2021 | Liu | H05B 3/06 |

FOREIGN PATENT DOCUMENTS

| | | |
|---|---|---|
| CN | 201146614 | 11/2008 |
| CN | 201260250 | 6/2009 |
| CN | 2013762688 | 5/2010 |
| CN | 201499325 | 6/2010 |
| CN | 102072557 | 5/2011 |
| CN | 202160295 | 3/2012 |
| CN | 202267222 | 6/2012 |
| CN | 202551366 | 11/2012 |
| CN | 202734250 | 2/2013 |
| CN | 202928069 | 5/2013 |
| CN | 202957997 | 5/2013 |
| CN | 203349481 | 12/2013 |
| CN | 103743088 | 4/2014 |
| CN | 203586522 | 5/2014 |
| CN | 203687327 | 7/2014 |
| CN | 103994570 | 8/2014 |
| CN | 203766439 | 8/2014 |
| CN | 104159343 | 11/2014 |
| CN | 204119542 | 1/2015 |
| CN | 201420552731 | 1/2015 |
| CN | 2014205527312 | 1/2015 |
| DE | 2942523 | 4/1981 |
| DE | 4016381 | 12/1991 |
| DE | 4300163 | 3/1994 |
| DE | 1948169 | 5/1999 |
| EP | 0899985 | 3/1999 |
| EP | 2022687 | 2/2009 |
| EP | 2734007 | 5/2014 |
| EP | 3001118 | 3/2016 |
| JP | S59136767 | 8/1984 |
| JP | H04108001 | 9/1992 |
| JP | H05114467 | 5/1993 |
| JP | H0621195 | 3/1994 |
| KR | 1020120135574 | 12/2012 |

(56) References Cited

FOREIGN PATENT DOCUMENTS

| | | |
|---|---|---|
| WO | 9831045 | 7/1998 |
| WO | 9831945 | 7/1998 |

OTHER PUBLICATIONS

Extended European Search Report dated Jun. 23, 2020 (Jun. 23, 2020) issued on related European Patent Application 20172035.6 by the European Patent Office.
Communication pursuant to Article 94(3) EPC dated Sep. 12, 2021 (Sep. 12, 2017) issued on related European Patent Application 15165340.9 by European Patent Office.
Communication pursuant to Article 94(3) EPC dated Feb. 15, 2019 (Feb. 15, 2019) issued on related European Patent Application 15165340.9 by European Patent Office.
List 1: references cited by opponent in Chinese nullity action against the priority patent CN 204119542U (application No. CN 201420552731. 2).
List 2: references cited by defendant in response to our warning letter based on EP 3001118.
List 3: references cited by opponent in German nullity action against EP 3001118.
List 4: references cited by defendant in French PI proceedings based on EP 3001118.
List 5: references cited by opponent in opposition before the EPO against EP 3913298.
Piece 13 from List 4: references cited by defendant in French PI proceedings based on EP 3001118—Asked of U.S. Appl. No. 15/415,512 filed to United States Patent and Trademark Office (USPTO) and objection.
Piece 15 from List 4: references cited by defendant in French PI proceedings based on EP 3001118—Answer of Bestway to Office European of the patents in date of Oct. 27, 2016.
D4 from List 5: references cited by opponent in opposition before the EPO against EP 3913298—Submission During Examination by Bestway Inflatables & Material Corp., Filed Apr. 22, 2022 (Apr. 22, 2022).
From List 3: references cited by opponent in German nullity action against EP 3001118—NKs Feature Breakdown of Claim 1 of the Patent in suite D1 KR20120135574A.
Consolidated List Of Cited Documents issued on European patent application 21179263.5, 1 page.
Non-final rejection for U.S. Appl. No. 15/415,512, 11 pages, issued by the USPTO.
Response to Communication pursuant to Rules 69, 70(2) and 70a(2) EPC filed by Bestway with the European Patent Office, Oct. 27, 2016 (Oct. 27, 2016), 4 pages.
Response to Communication pursuant to Rule 70a(1) EPC filed by Bestway with the European Patent Office, Apr. 22, 2022 (Apr. 22, 2022), 4 pages.
Assignment from Liu, Feng to Bestqway Inflatables & Materials Corp. filed at the USPTO, with an execution date of Mar. 11, 2015, 3 pages.
EN 60335-1: 2012 (excerpt), 1 page.
EN 60335-2-60: 2003 +A1 +A2 +A11 +A12 (excerpt), 1 page.
Cover Sheet of TUV report from Intex Development Company Limited, with an order date of Apr. 22, 2014, 1 page.
Photo documentation submitted for TUV report by Intex Development Company Limited, 2 pages.
Affidavit by Ai Ming Tan (TAM) of Nov. 14, 2022, 1 page.
TUV report for Bestway Inflatables & Material Corp., with an order date of Apr. 21, 2011, and filed by Bestway Global Holding Inc. as D39 in opposition proceedings against EP3225764, 135 pages (parts 1, 2 and3).
EESR for EP3001118B1 dated Apr. 4, 2016 (Apr. 4, 2016), 8 pages.
EESR for EP3705803B1 dated Jun. 23, 2020 (Jun. 23, 2020), 7 pages.
EESR for EP3913298B1 dated Oct. 22, 2021 (Oct. 22, 2021), 9 pages.
EESR for EP23159121.5 dated Jun. 23, 2023 (Jun. 23, 2023), 9 pages.
European Patent Office Communication dated Mar. 21, 2024 (Mar. 21, 2024) regarding Opponent Letter (Studio Torta representing Intex) dated Mar 14, 2024—Opposition Proceedings EP-B-3191298 (application No. EP21179263.5) in the name of Bestway Inflatables & Material Corp. (related European Patent Application).
Communication of a Notice of Opposition dated Mar. 13, 2024 (Mar. 13, 2024), 81 pages (3 parts), issued on the related European Patent Application 20172035.6 by the European Patent Office.
Additional list of references in support of opponent's Notice of Opposition, list filed Jul. 5, 2024 (Jul. 5, 2024), 27 pages, Opposition filed Mar. 7, 2024 (Mar. 7, 2024) and referenced by Communication of Notice of Opposition dated Mar. 13, 2024 (Mar. 13, 2024), Additional references filed by European Patent Firm Reddie & Gross to the European Patent Office.

* cited by examiner

PTC HEATER

CROSS-REFERENCE TO RELATED APPLICATIONS

This application is a continuation of U.S. patent application Ser. No. 15/698,776, filed Sep. 8, 2017, which is a continuation-in-part application of U.S. patent application Ser. No. 15/414,190, filed Jan. 24, 2017, which is a continuation of U.S. patent application Ser. No. 14/676,665, filed Apr. 1, 2015 (now U.S. Pat. No. 9,618,230, issued Apr. 11, 2017), which claims priority to Chinese Application No. 201420552731.2, entitled "PTC HEATER," filed on Sep. 24, 2014, the disclosure of which is incorporated by reference herein in its entirety.

BACKGROUND INFORMATION

1. Technical Field

The present invention relates generally to liquid heaters, and more specifically, to a positive temperature coefficient heater.

2. Background

Currently, positive temperature coefficient ("PTC") heaters are widely applied in household appliances such as spa pools, entertainment pools, water dispensers, foot baths, and other industrial products.

A PTC heater, which is commonly known in the art, includes a heat conductor, PTC heating elements, and end covers having a water inlet and a water outlet. The heat conductor includes a plurality of ducts separated from one another, where some of the ducts are used for housing PTC heating elements, and some of the ducts are used as liquid passage channels. The end covers are coupled to each axial end of the heat conductor, first serving as liquid passage channels in fluid communication with the heat conductor, and secondly serving to seal each end of the duct in which a PTC heating element is placed within the heat conductor.

A disadvantage of these types of PTC heaters lie in the fact that the entire PTC heating element, aside from wires, is disposed in the duct of the heat conductor. Also, end faces of the end covers butt directly against end faces of the heat conductor, and the PTC heating element is positioned inside of the end covers. Once the end covers are sealed with the heat conductor, water permeates or leaks through the joining faces of the end covers and the heat conductor and drip on or otherwise come into contact with the PTC heating element.

Additionally, the housing of existing PTC heating elements is a tubular metal piece. A heating assembly, electrode sheets, and insulating paper are disposed within the housing, and each end of the tubular housing is sealed with rubber plugs or an insulation paste. Once the rubber plugs and the insulation paste are damaged, a gap or space is created at the ends of the tubular housing that permits water to seep into the interior of the housing. This may cause electricity to leak from the heater, resulting in an electrical short or damage to electrical components coupled to the heater.

Thus, a need therefore exists for heating unit that overcomes the disadvantages and safety risks found in currently known PTC heaters. In particular, there is a need for a PTC liquid heater that improves safety, is simple in structure, and effectively prevents electricity from leaking out of the heater.

SUMMARY

With regard to the defects presently existing in the prior art, the technical problem to be solved by the present invention is to provide a PTC liquid heater with a protective layer that improves safety, has a simple structure, and effectively prevents electrical leakage.

In order to solve the above-mentioned technical problem, there is provided a first example of an implementation of a PTC heater according to the present invention. The PTC heater includes a heat conductor, a first end cover, a second end cover, and at least one PTC heating element. The heat conductor includes at least one duct for accommodating a PTC heating element, at least one first liquid passage channel, and at least one second liquid passage channel.

The first end cover is fixedly coupled to one end of the heat conductor. The first end cover is internally provided with a first compartment, a second compartment, an end cover water inlet, and an end cover water outlet. The end cover water inlet is in fluid communication with the first compartment and the first liquid passage channel. The end cover water outlet is in fluid communication with the second compartment and the second liquid passage channel.

The second end cover is fixedly coupled to an opposite end of the heat conductor. The first liquid passage channel and the second liquid passage channel are in fluid communication with each other via an internal space in the second end cover, so as to form a closed liquid circulation channel.

The at least one PTC heating element is disposed in the duct of the heat conductor. The PTC heating element may be constructed to have a length longer than that of the heat conductor such that at least one end the PTC heating element extends out of the duct.

In some implementations, the first end cover includes at least one groove capable of accommodating the portion of the PTC heating element extending out of the duct. The groove is in communication with an external space.

In some implementations, the second end cover further includes at least one opening capable of accommodating the end of the PTC heating element extending out of the duct. In some implementations, a first sealing gasket is interposed between an end face of the first end cover and an end face of the heat conductor. The first sealing gasket surrounds a mouth formed at one end of the first liquid passage channel and a mouth formed at one end of the second liquid passage channel.

In some implementations, a second sealing gasket is also interposed between an end face of the second end cover and an opposing end face of the heat conductor. The second sealing gasket surrounds a mouth formed at an opposing end of the first liquid passage channel and a mouth formed at an opposing end of the second liquid passage channel.

In some implementations, the portion of the PTC heating element extending out of the duct is wrapped with an insulating and sealing layer. In some implementations, the insulating and sealing layer may comprise an epoxy filler, a rubber sheath, or a rubber sealing plug.

In order to solve the above-mentioned technical problem, there is further provided a second example of an implementation of a PTC heater according to the present invention. The PTC heater includes a heat conductor, a first end cover, a second end cover, and at least one PTC heating element. The heat conductor includes at least one duct for accommodating a PTC heating element, and at least one liquid passage channel.

The first end cover is fixedly coupled to one end of the heat conductor. The first end cover includes an end cover water inlet in fluid communication with one end of the liquid passage channel.

The second end cover is fixedly coupled to an opposite end of the heat conductor. The second end cover includes an end cover water outlet in fluid communication with the opposite end of the liquid passage channel.

The at least one PTC heating element is disposed in the duct of the heat conductor. The PTC heating element may be constructed to have a length longer than that of the heat conductor such that at least one end of the PTC heating element extends out of the duct.

In some implementations, the first end cover includes at least one first groove capable of accommodating the part of the PTC heating element extending out of the duct. The first groove is in communication with an external space.

In some implementations, the second end cover also includes at least one second groove capable of accommodating the portion of the PTC heating element extending out of the duct. The second groove is also in communication with the external space.

In some implementations, a first sealing gasket is interposed between an end face of the first end cover and an end face of the heat conductor. The first sealing gasket surrounds a mouth formed at an end of the liquid passage channel.

In some implementations, a second sealing gasket is interposed between an end face of the second end cover and an opposing end face of the heat conductor. The second sealing gasket surrounds a mouth formed at an opposing end of the liquid passage channel.

In some implementations, the portion of the PTC heating element extending out of the duct is wrapped with an insulating and sealing layer. In some implementations, the insulating and sealing layer may comprise an epoxy filler, a rubber sheath, or a rubber sealing plug.

Compared with PCT heating units presently in the art, the present invention has several advantages. First, PTC liquid heaters according to the present invention are mainly characterized in setting the length of the PTC heating element longer than that of the heat conductor so that at least one end of the PTC heating element is exposed out of the heat conductor. This causes the portion of the PTC heating element exposed out of the heat conductor to be located at the outer side of the joining face of the two end covers and the heat conductor. Furthermore, the present invention is characterized by providing an insulating and sealing layer on the portion of the PTC heating element exposed out of the duct, for protection, thus achieving a better insulating and sealing effect.

Compared with PCT heating units presently in the art, PTC heaters of the present invention may include a protective layer that may greatly reduce the risk of electrical leakage from the PTC heater, thereby providing high safety performance. Furthermore, PTC heaters according to the present invention provide a simple structure and can effectively prevent an electrical leakage accident and is, thus, likely to gain popularity.

One objective of the invention is to provide a safer heating apparatus that can avoid electrical leakage.

Another objective of the invention is to provide a heating apparatus that is simpler to make.

According to one aspect of the invention, a heating apparatus is disclosed. The heating apparatus comprises a PTC heating element, a first electrode, a second electrode, a first protection layer, a second protection layer, a first interlayer, and a second interlayer.

The PTC heating element has a first side and a second side. The first electrode is disposed on the first side of the PTC heating element. The second electrode is disposed on the second side of the PTC heating element. The first interlayer is located between the first protection layer and the first electrode. The first interlayer is insulating. The second interlayer is located between the second protection layer and the second electrode. The second interlayer is insulating. A hardness of the first protection layer is greater than that of the first interlayer. A hardness of the second protection layer is greater than that of the second interlayer.

According to another aspect of the invention, a heating apparatus is disclosed. The heating apparatus comprises a PTC heating element, a first electrode, a second electrode, a first protection layer, a second protection layer, a first interlayer, a second interlayer, and a heat conductive housing. The PTC heating element has a first side and a second side. The first electrode is disposed on the first side of the PTC heating element. The second electrode is disposed on the second side of the PTC heating element. The first interlayer is located between the first protection layer and the first electrode. The first interlayer is insulating. The second interlayer is located between the second protection layer and the second electrode. The second interlayer is insulating.

The PTC heating element, the first electrode, the second electrode, the first protection layer, the second protection layer, the first interlayer, the second interlayer are placed into the heat conductive housing. A first side wall and a second side wall of the heat conductive housing are inwardly curved.

According to still another aspect of the invention, a method for making a heating apparatus is disclosed. First, a first electrode and a second electrode are attached onto two sides of a PTC ceramic element respectively through an adhesive material. Next, the PTC ceramic element, the first electrode, and the second electrode are wrapped by a first insulating layer. Then, a first protection layer is attached onto the first electrode with the first insulating layer in between.

Then, a second protection layer is attached onto the second electrode with the first insulating layer in between. Then, the first protection layer and the second protection layer are wrapped by a second insulating layer around. Then, the PTC ceramic element, the first electrode, the second electrode, the first insulating layer, the first protection layer, the second protection layer, and the second insulating layer are placed into a heat conductive housing.

According to still another aspect of the invention, a method for making a heating apparatus is disclosed. First, a first electrode and a second electrode are attached onto two sides of a PTC ceramic element respectively through an adhesive material. Next, the PTC ceramic element, the first electrode, and the second electrode are wrapped by a first insulating layer.

Then, the PCT ceramic element, the first electrode, the second electrode, and the first insulating layer are placed into a tubular protection layer. Then, the tubular protection layer is wrapped by a second insulating layer. Then, the PTC ceramic element, the first electrode, the second electrode, the first insulating layer, the tubular protection layer, and the second insulating layer are placed into a heat conductive housing.

BRIEF DESCRIPTION OF THE DRAWINGS

The above-mentioned and other features, properties and advantages of the present invention will become more apparent from the following description of embodiments with reference to the accompany drawings, in which.

DETAILED DESCRIPTION

Figure 1:
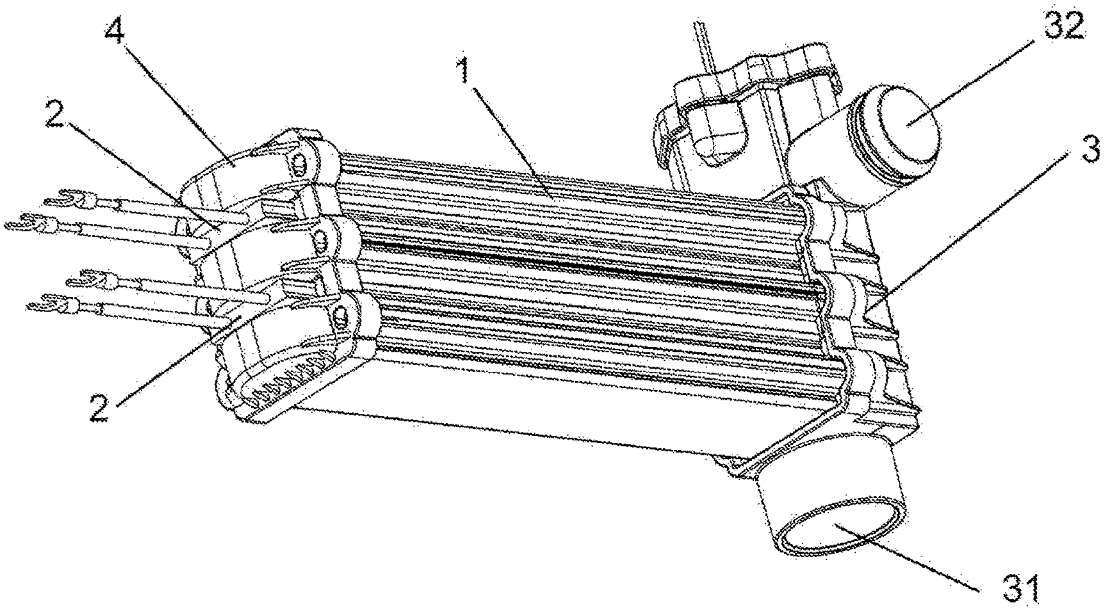
FIG. 1 is a perspective view illustrating one example of an implementation of a PTC heater according to the present invention.

The present invention will be further described below in conjunction with detailed embodiments and the accompanying drawings. More details are provided in the following detailed description in order for the present invention to be fully understood. However, the present invention can be implemented in various ways other than those described herein. A person skilled in the art can make similar analogy and modification according to the practical applications without departing from the spirit of the present invention, and therefore the contents of the detailed embodiments herein should not be construed as limiting to the scope of the present invention.

FIGS. 1-6 illustrate an example of one implementation of a PTC heater according to the teachings of the present invention. It should be noted that these and the following drawings are merely used as examples, and are not necessarily drawn to scale, and should not be construed as limiting to the scope of the present invention.

Referring to FIGS. 1-6, the PTC heater mainly includes a heat conductor 1, a first end cover 3, a second end cover 4 and at least one PTC heating element 2. The heat conductor 1 is an elongated, hollow aluminum member that includes at least one duct 11 (FIG. 2) capable of accommodating a PTC heating element 2, at least one first liquid passage channel 12 (FIG. 2), and at least one second liquid passage channel 13 for communicating liquid passing therethrough. The at least one duct 11, the at least one first liquid passage channel 12, and the at least one second liquid passage channel 13 all extend through the interior of the heat conductor 1.

The PTC heating element 2 generally includes a housing, a heating assembly, insulating paper, and two electrode sheets which are placed within the housing. The two electrode sheets are provided at opposite sides of the heating assembly. At least one layer of insulating paper wraps the electrode sheet positioned disposed outside of the heating assembly. The housing comprises a hollow aluminum tube. At least one layer of sealing plug is provided at each end of the aluminum tube. The outside of the sealing plug is filled with a sealant. PTC heating elements are well known in the art and are therefore not described in detail in the present application.

The PTC heating element 2 may be positioned within the duct 11 of the heat conductor 1 fixed, by means of cold-pressing and well butts, against an inner surface of the duct 11. In order to prevent electrical leakage due to contact between the PTC heating element 2 and a precipitant or liquid, the PTC heating element 2 may be constructed to a length that is longer than the length of the heat conductor 1 such that at least one end of the PTC heating element 2 extends out from the duct 11 of the heat conductor 1.

Two ends of the heat conductor 1 are fixedly coupled to the first end cover 3 and the second end cover 4, respectively. A first compartment 33, a second compartment 34, an end cover water inlet 31 (FIG. 1), and an end cover water outlet 32 (FIG. 1) are provided in the first end cover 3. The end cover water inlet 31 is in communication with the first compartment 33 of the first end cover 3 and the first liquid passage channel 12 of the heat conductor 1. The end cover water outlet 32 is in fluid communication with the second compartment 34 of the first end cover 3 and the second liquid passage channel 13 of the heat conductor 1. The first liquid passage channel 12 and the second liquid passage channel 13 of the heat conductor 1 are in fluid communication with each other via an internal space (FIG. 3) formed in the second end cover 4, thereby forming a closed liquid circulation channel.

When the liquid is heated, the liquid flows from the end cover water inlet 31 of the first end cover 3 into the first compartment 33, and from the first compartment 33 into the first liquid passage channel 12 of the heat conductor 1. The liquid then flows through the interior of the second end cover 4 into the second liquid passage channel 13 of the heat conductor 1. The liquid then leaves the second liquid passage channel 13, enters the second compartment 34 of the first end cover 3, and exits the heater out of the end cover water outlet 32 of the first end cover 3.

Figure 2:
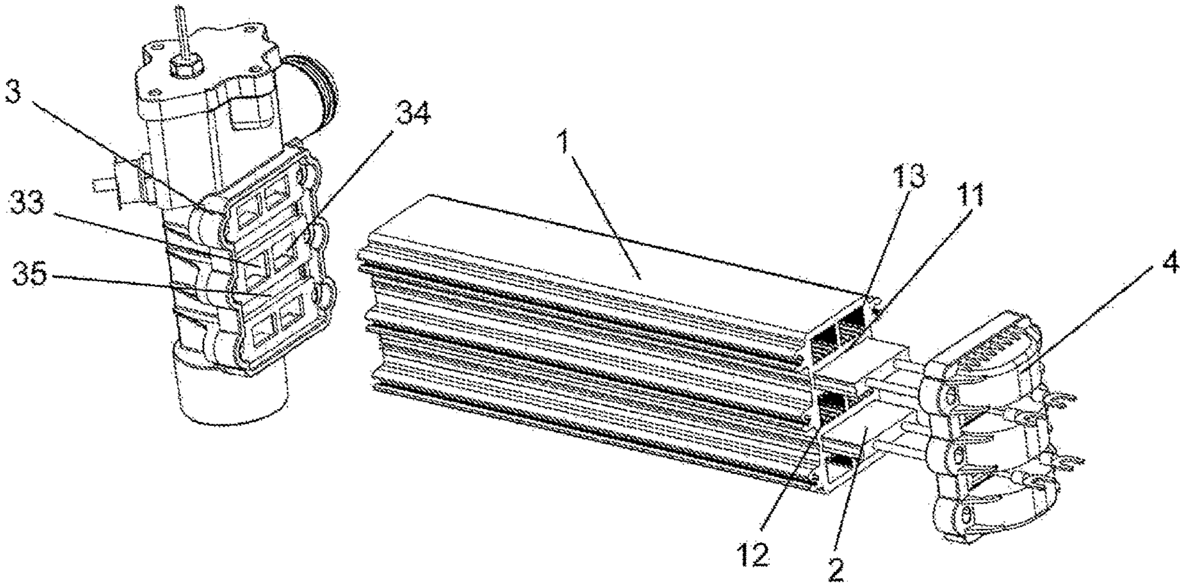
FIG. 2 is an exploded view of the PTC heater illustrated in FIG. 1.
Figure 3:
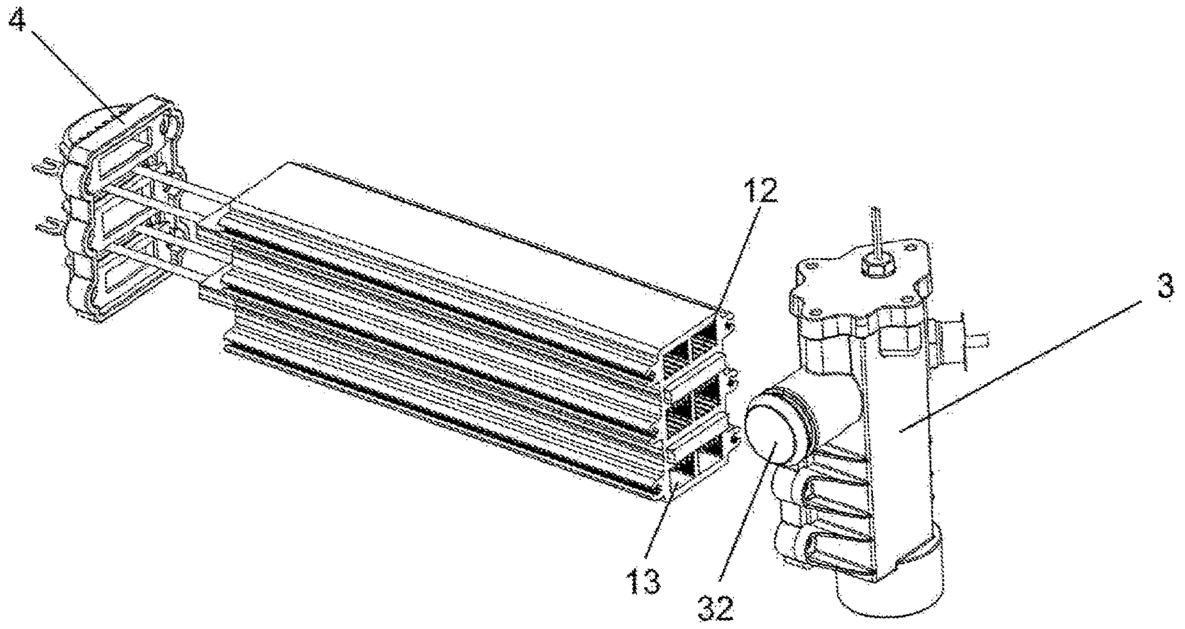
FIG. 3 is another exploded view of the PTC heater illustrated in FIG. 1.

According to this implementation, as best shown in FIG. 2, the first end cover 3 includes at least one groove 35 capable of accommodating a portion of the PTC heating element 2 extending out of the duct 11. The groove 35 extends through the first end cover 3 and is in communication with an external space (i.e., the atmospheric space outside of the PTC heater). Furthermore, a first sealing gasket 36 (FIG. 4) is interposed between an end face (FIG. 2) of the first end cover 3 and an end face (FIG. 3) of the heat conductor 1. The gasket 36 surrounds a mouth formed at one end of the first fluid passage channel 12 and the second fluid passage channel 13.

Figure 4:
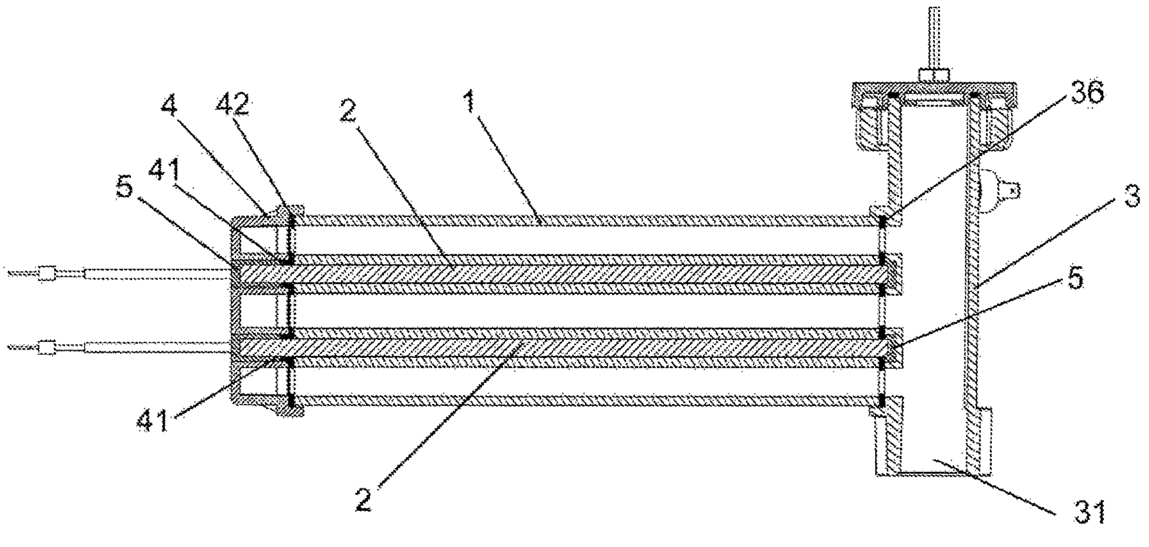
FIG. 4 is a cross-sectional view of the PTC heater illustrated in FIG. 1 showing the fluid communication between the end cover water inlet of the first end cover and the first liquid passage channel.
Figure 5:
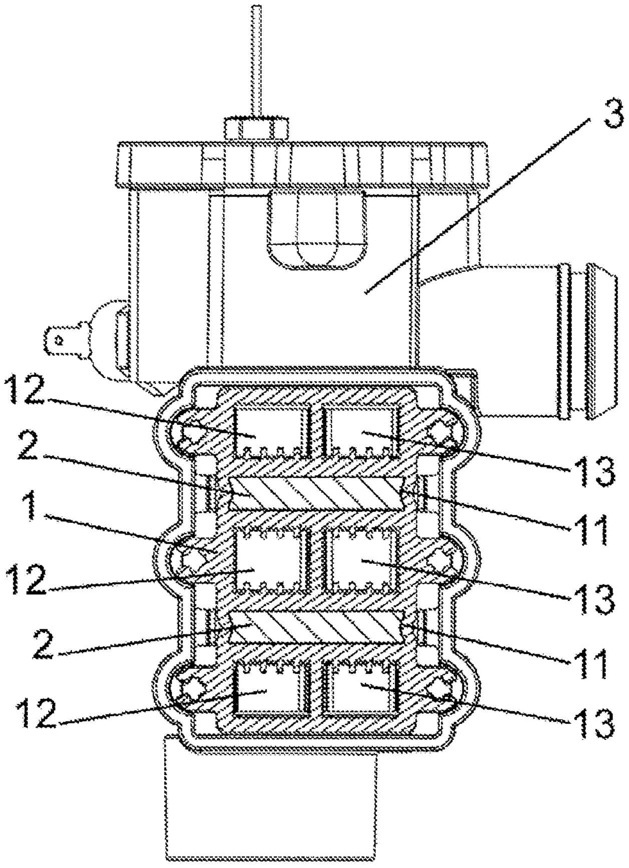
FIG. 5 is cross-sectional view of PTC heater illustrated in FIG. 1, taken across line 1-1.
Figure 6:
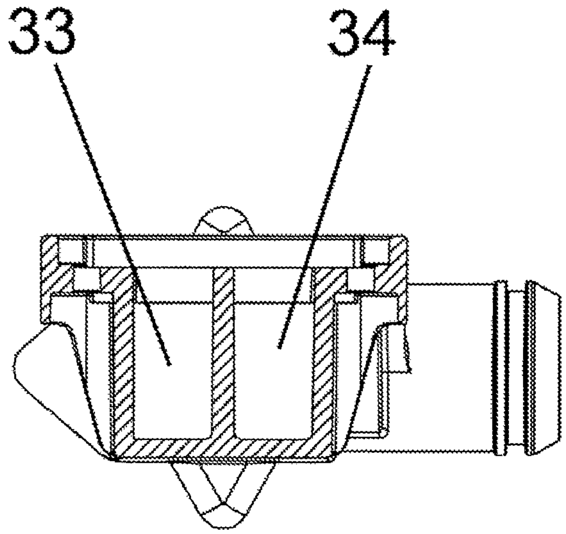
FIG. 6 is cross-sectional view of first end cover illustrated in FIG. 2, taken across line 2-2.
Figure 7:
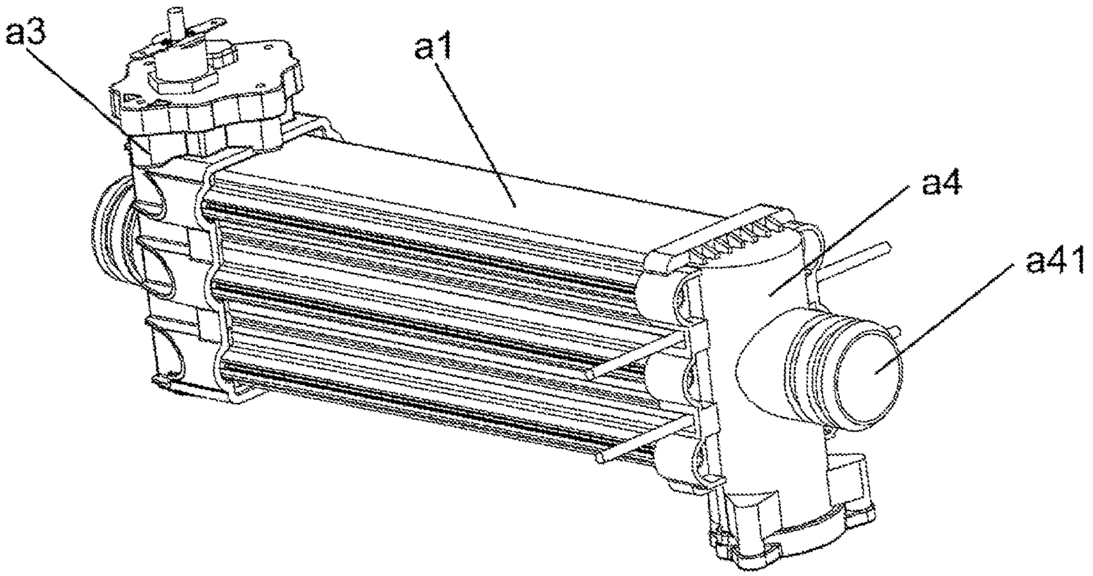
FIG. 7 is a perspective view illustrating a second example of an implementation of a PTC heater according to the present invention.

Similarly, as best shown in FIG. 4, the second end cover 4 also includes at least one opening 41 capable of accommodating an end of the PTC heating element 2 extending out of the duct 11. A second sealing gasket 42 is interposed between an end face (FIG. 3) of the second end cover 4 and an opposing end face (FIG. 2) of the heat conductor 1. The gasket 42 surrounds a mouth formed at an opposing end of the first fluid passage channel 12 and the second fluid passage channel 13.

In order to achieve better insulation, the portion of the PTC heating element 2 extending out of the duct 11 may be wrapped with an insulating and sealing layer 5 for protection. It may be preferred to fill an epoxy resin at the opening 41 of the second end cover 4 so as to wrap the exposed part of the PTC heating element 2 and form the insulating and sealing layer 5; however, in other implementations, depending on the application, a waterproof insulating rubber sheath, or insulating and sealing rubber plug may be used at the opening 41 of the second end cover 4 to provide insulation and sealing protection for the exposed portion of the PTC heating element 2. The above-mentioned insulating and sealing methods may effectively prevent leaking liquid from coming into contact with the PTC heating element 2, thereby avoiding an electrical leakage incident.

FIGS. 7-10 illustrate a second example of an implementation of a PTC heater according to the teaching of the present invention. The PTC heater includes a heat conductor a1, a first end cover a3, a second end cover a4, and at least one PTC heating element a2. The arrangement of the heat conductor a1 and the PTC heating element a2 are substantially the same as that described in the previous example.

Figure 8:
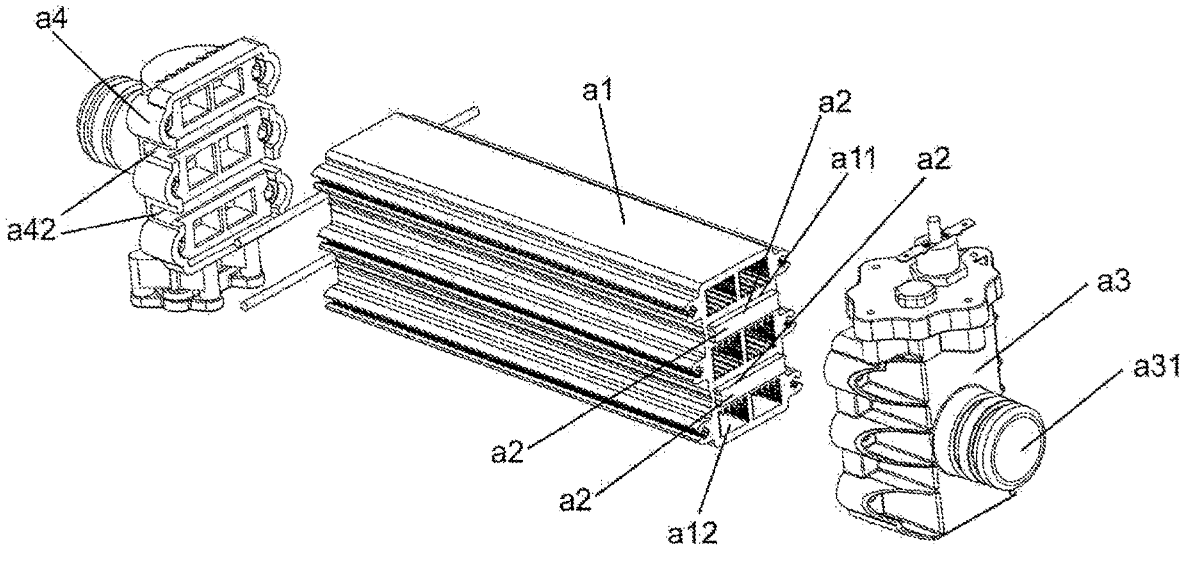
FIG. 8 is an exploded view of the PTC heater illustrated in FIG. 7.
Figure 9:
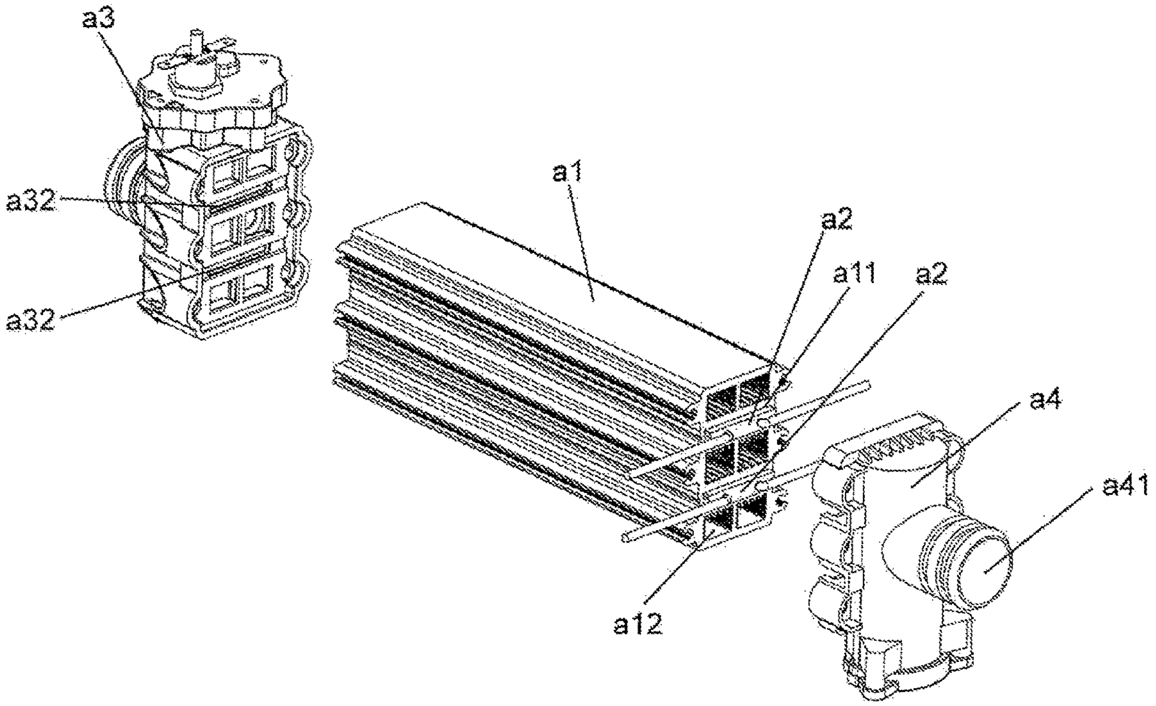
FIG. 9 is another exploded view of the PTC heater illustrated in FIG. 7.
Figure 10:
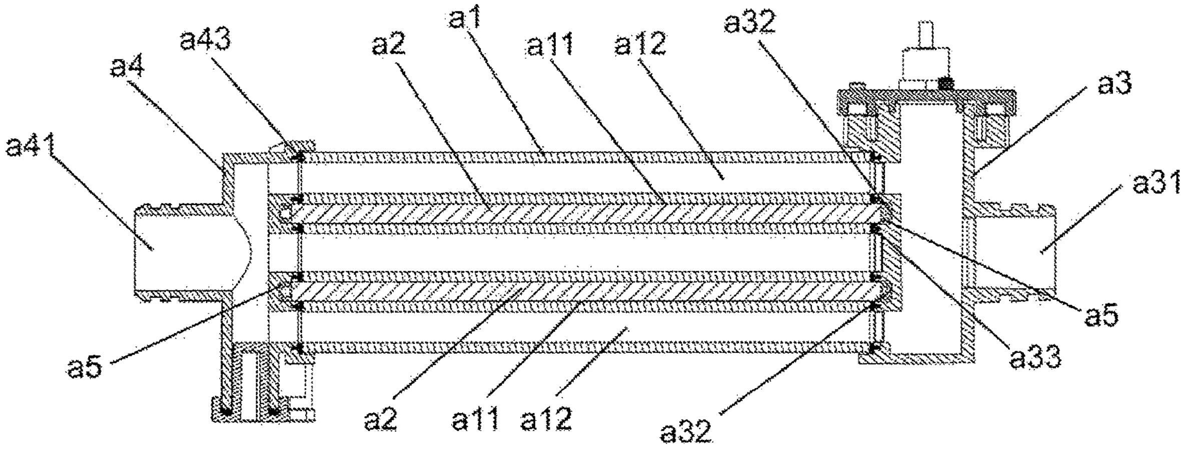
FIG. 10 is a cross-sectional view of the PTC heater illustrated in FIG. 1 showing the fluid communication between the end cover water inlet, the end cover water outlet and the liquid passage channels.

For instance, as best shown in FIG. 8, the heat conductor a1 may comprise an elongated, hollow aluminum member, internally provided with at least one duct all capable of accommodating the PTC heating element a2 and at least one liquid passage channel a12. The at least one duct all and the at least one liquid passage channel a12 both extend through an interior of the heat conductor a1. At least one PTC heating element a2 positioned within the duct all of the heat conductor a1 is fixed, by means of cold pressing and well butts, against an inner surface of the duct all. In order to prevent electrical leakage due to contact between the PTC heating element a2 and a precipitant or liquid, the PTC heating element a2 may be constructed to a length longer than that of the heat conductor a1 such that at least one end of the PTC heating element a2 extends out of the duct all of the heat conductor a1. Two ends of the heat conductor a1 are fixedly coupled to the first end cover a3 and the second end cover a4, respectively. The first end cover a3 includes an end cover water inlet a31 in fluid communication with one end of the liquid passage channel a12. The second end cover a4 includes an end cover water outlet a41 (FIG. 7) in fluid communication with the opposite end of the liquid passage channel a12.

When the liquid is heated, the liquid flows from the end cover water inlet a31 of the first end cover a3, through the liquid passage channel a12 of the heat conductor a1, and out of the end cover water outlet a41 of the second end cover a4.

In this example, the first end cover a3 includes at least one first groove a32 (FIG. 9) capable of accommodating a portion of the PTC heating element a2 extending out of the duct all. The first groove a32 extends through the first end cover a3 and is in communication with ambient space outside of the PTC heater. Furthermore, a first sealing gasket a33 (FIG. 10) is interposed between an end face (FIG. 9) of the first end cover a3 and an end face (FIG. 8) of the heat conductor a1, to surround a mouth formed at one end of the liquid passage channel a12.

Similarly, the second end cover a4 includes at least one second groove a42 capable of accommodating a portion of the PTC heating element a2 extending out of the duct a11. The second groove a42 extends width-wise through an interior of the second end cover a4 and is in communication with the external space. Furthermore, a second sealing gasket a43 is interposed between an end face (FIG. 8) of the second end cover a4 and an end face (FIG. 9) of the heat conductor a1, to surround a mouth formed at an opposite end of the liquid passage channel a12.

In order to achieve better insulation, the portion of the PTC heating element a2 extending out of the duct all may be wrapped with an insulating and sealing layer a5 for protection. It is preferable in the present embodiment to fill an epoxy resin at the first groove a32 of the first end cover a3 and the second groove a42 of the second end cover a4 so as to wrap the exposed part of the PTC heating element a2 to form an insulating and sealing layer a5. In addition to this, depending on the application, the insulating and sealing layer a5 may comprise a waterproof insulating rubber sheath, or an insulating and sealing rubber plug to provide an insulating and sealing protection for the exposed portion of the PTC heating element a2. The present implementation may effectively prevent leaking liquid from coming into contact with the PTC heating element a2, thereby avoiding the occurrence of an electrical leakage accident.

In summary, PTC liquid heaters of the present invention are characterized by constructing the length of the PTC heating element longer than that of the heat conductor so that at least one end of the PTC heating element extends from of the heat conductor. This causes the portion of the PTC heating element extending out of the heat conductor to be located at the outer side of the joining face of the two end covers and the heat conductor. Furthermore, the present invention is characterized by providing an insulating and sealing layer on the portion of the PTC heating element extending out of the duct for protection, thus achieving an enhanced insulating and sealing effect.

While described herein as being constructed of aluminum, the various components of the PCT heater may be constructed of stainless steel, plastic, alloy metal, or any other suitable non-corrosive material. Compared with prior art devices, PTC heaters of the present invention are advantageous because they include a protective layer that greatly reduces the risk of electrical leakage from the PTC heater, thereby providing high safety performance. Furthermore, PTC heaters according to the present invention comprise a simple structure and are effective in preventing an electrical leakage accident; thus, making them desirable to consumers.

In general, terms such as "coupled to," and "configured for coupling to," and "secured to," and "configured for securing to" and "in communication with" (for example, a first component is "coupled to" or "is configured for coupling to" or is "configured for securing to" or is "in communication with" a second component) are used herein to indicate a structural, functional, mechanical, electrical, signal, optical, magnetic, electromagnetic, ionic or fluidic relationship between two or more components or elements. As such, the fact that one component is said to be in communication with a second component is not intended to exclude the possibility that additional components may be present between, and/or operatively associated or engaged with, the first and second components.

Figure 11:
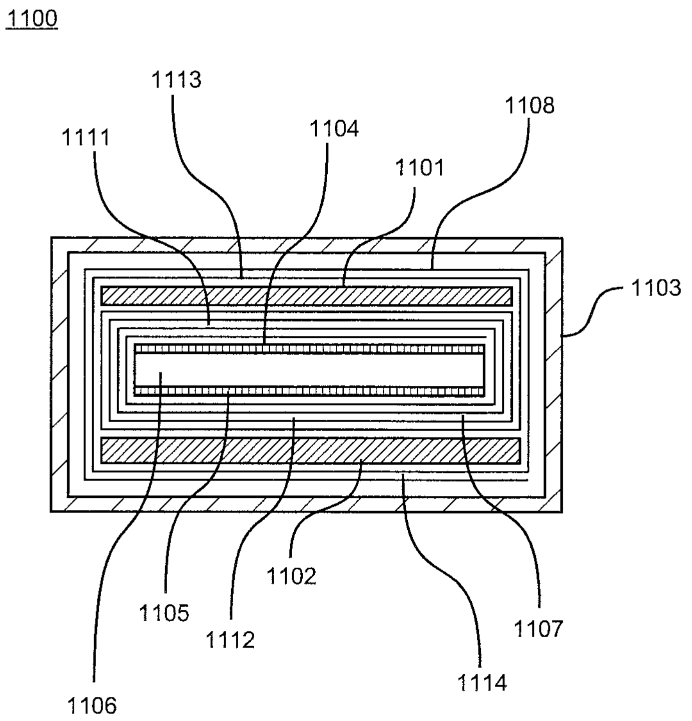
FIG. 11 shows an embodiment of a PTC heating apparatus.
Figure 12:
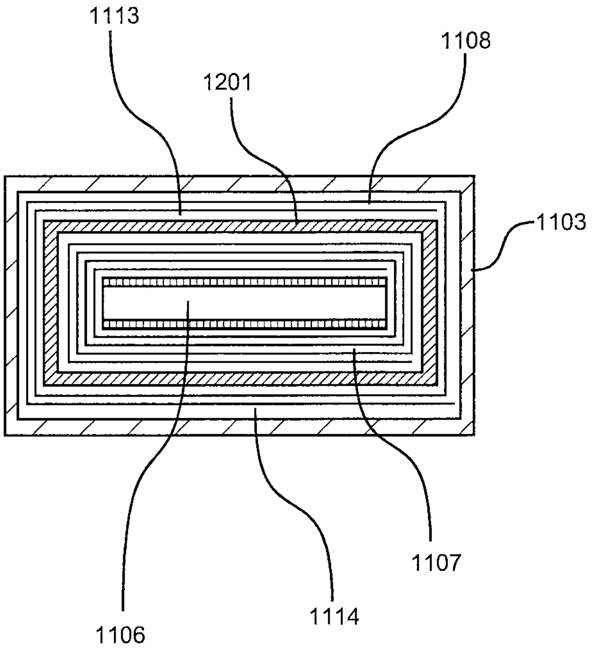
FIG. 12 shows another embodiment of a PTC heating apparatus.
Figure 13:
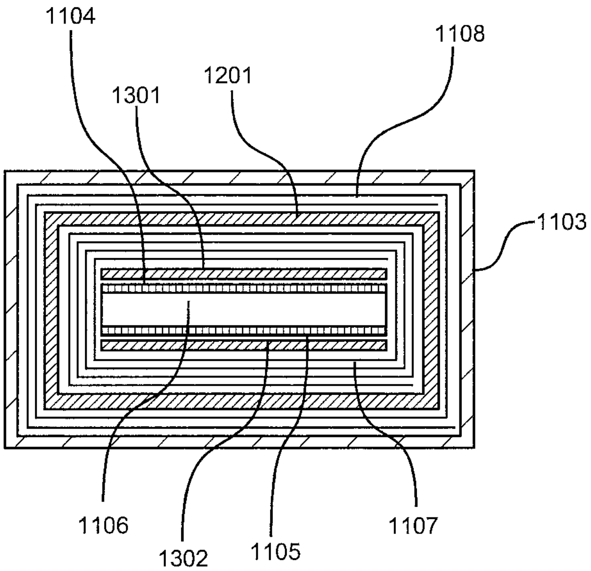
FIG. 13 shows another embodiment of a PTC heating apparatus.

FIG. 11 shows an embodiment of a PTC heating apparatus. FIG. 12 shows another embodiment of a PTC heating apparatus. FIG. 13 shows another embodiment of a PTC heating apparatus.

Referring to FIG. 2, a duct 11 is formed in the heat conductor 1 for accommodating a PTC heating element 2. In some embodiments, the PTC heating element 2 comprises ceramic material. In this case, the PTC heating element 2 is called a PTC ceramic element. The ceramic material has a feature that its resistance increases upon heating. With reference to FIG. 11, in some embodiments, two electrodes 1104 and 1105 are provided on two sides of the ceramic material.

In some embodiments, with reference to FIG. 11, the electrodes 1104 and 1105 are sheet electrodes. In some embodiments, the PTC heating apparatus 1100 comprises a first insulating layer 1107, a second insulating layer 1108, a first protection layer 1101, and a second protection layer 1102. The PTC heating apparatus 1100 can be used as the PTC heating element 2 in FIG. 2. In some embodiments, the PTC heating apparatus comprises a plurality of insulating layers and a plurality of protection layers. In some embodiments, two ends of the PTC heating elements are filled with a sealing material. In some embodiments, the sealing material is a polymer material, like epoxy.

In some embodiments, each of the two sheet electrodes 1104 and 1105 is connected to a conductive line. In some embodiments, the PTC ceramic element 1106, the sheet electrodes 1104 and 1105, are wrapped by an insulating layer 1107 or a plurality of insulating layers 1107. In some embodiments, the insulating layers are polymer layers. In some embodiments, the insulating layers are polyimide layers.

With reference to FIG. 11, the heating apparatus 1100 can have one or more protection layers. For example, the heating apparatus 1100 can have a first protection layer 1101 and a second protection layer 1102. The material for the protection layers can be aluminium, stainless steel, or copper. The aluminium material and the copper material have good heat conductivity. In some embodiments, the first protection layer 1101 is a metal layer having an insulating film attached on it. In some embodiments, the second protection layer 1102 is a metal layer having an insulating film attached on it. The combination of a metal layer and an insulating film is a composite film.

The composite film can be an aluminium layer with an insulating film, a copper layer with an insulating film, or a stainless layer with an insulating film. In some embodiments, the material of the protection layers are ceramic based. For example, the materials for the protection layer 1101 or the protection layer 1102 can contain aluminium oxide ($Al_2O_3$) or Zirconium dioxide ($ZrO_2$). In some embodiments, the protection layer 1101 and the protection layer 1102 comprise mica group of sheet silicate (phyllosilicate) minerals if the mica group has good heat conductivity.

With reference to FIG. 11, in some embodiments, a PTC heating element 1100 comprises a heat conductive housing 1103, a PTC ceramic element 1106, a first electrode 1104, a second electrode 1105, a first protection layer 1101, a second protection layer 1102, a first set of insulating layers 1107, and a second set of insulating layers 1108. In some embodiment, the protection layers 1101 and 1102 are flat in shape.

A portion of the first set of the insulating layers 1107 located between the first electrode 1104 and the first protection layer 1101 is referred to as a first interlayer 1111. A portion of the first set of the insulating layers 1107 located between the second electrode 1105 and the second protection layer 1102 is referred to as a second interlayer 1112. It is noted that both the first interlayer 1111 and the second interlayer 1112 are insulating. In some embodiments, a hardness of the first protection layer 1101 is greater than that of the first insulating layer 1107. In some embodiments, a hardness of the second protection layer 1102 is greater than that of the first insulating layer 1107.

With reference to FIG. 11, the first protection layer 1101 and the second protection layer 1102 are flat in shape. The first protection layer 1101 and the second protection layer 1102 are placed on opposite sides of the PTC ceramic element 1106. With reference to FIG. 12, in some embodiments, a protection layer 1201 is tubular. The tubular shape protection layer 1201 can have a closed side wall or a disconnected side wall. With reference to FIG. 11, the first protection layer 1101 and the second protection layer 1102 are wrapped by a second set of insulating layers 1108. With reference to FIG. 12, the tubular protection layer 1201 is wrapped by a second set of insulating layers 1108.

With reference to FIG. 11, a portion of the second set of insulating layers 1108 located between the first protection layer 1101 and the heat conductive housing 1103 is referred to as a first outer layer 1113. A portion of the second set of the insulating layers 1108 located between the second protection layer 1102 and the heat conductive housing 1103 is referred to as a second outer layer 1114. It is noted that both the first outer layer 1113 and the second outer layer 1114 are insulating. With reference to FIG. 12, a portion of the second set of insulating layers 1108 on a top side of the tubular protection layer 1201 is referred to as a first outer layer 1113. A portion of the second set of insulating layers 1108 on a bottom side of the tubular protection layer 1201 is referred to as a second outer layer 1114. It is noted that both the first outer layer 1113 and the second outer layer 1114 are insulating.

With reference to FIG. 13, in some embodiments, an additional protection layers 1301 is placed on one side of the first electrode 1104. Similarly, in some embodiments, an additional protection layers 1302 is placed on one side of the second electrode 1105. In some embodiments, the first protection layer 1101 is located between the first set of insulating layers 1107 and the second set of insulating layers 1108.

In some embodiments, with reference to FIG. 11, when there are multiple first protection layers 1101, there is at least one insulating layer placed between any two first protection layers 1101. In some embodiments, when there are multiple second protection layers 1102, there is at least one insulating layer placed between any two second protection layers 1102. In some embodiments, the first protection layer 1101 covers and protects the first electrode 1104. The second protection layer 1102 covers and protects the second electrode 1105.

With reference to FIG. 13, in some embodiments, two additional protection layers 1301 and 1302 in flat shape can be placed on the first electrode 1104 and the second electrode 1105 respectively. In this case, the two additional protection layers 1301 and 1302 are within the tubular shape protection layer 1201.

In the manufacturing process, small particles can be attached onto the PTC ceramic element 1106. The small particles can be metal particles or other particles. The particles may damage the insulating layers by making small holes on the insulating layers under a press force. The small holes can cause electrical leakage or other safety concerns. The protection layers can be used to prevent the particles from damaging the insulating layers.

Figure 15:
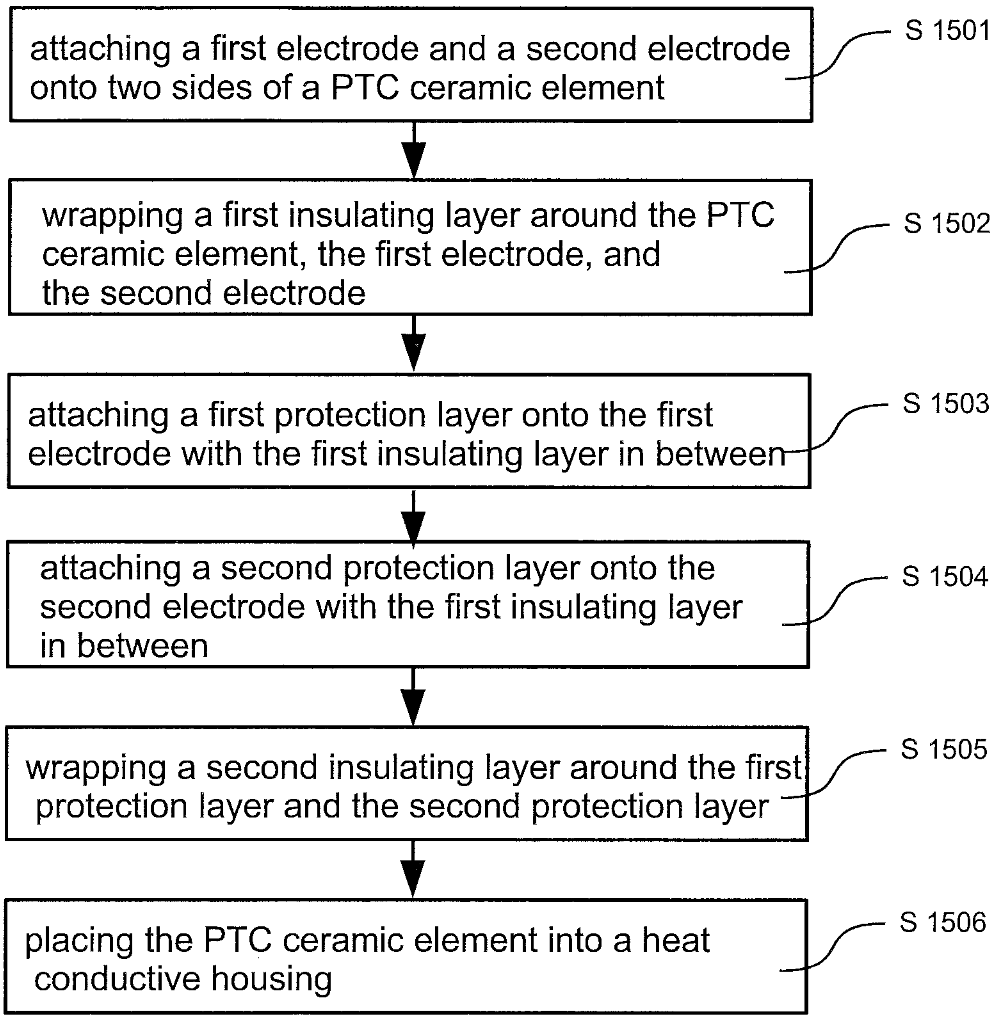
FIG. 15 is a flow chart of making a heating apparatus.

FIG. 15 is a flow chart of making a heating apparatus. With reference to FIG. 15. a brief version of a method of making a heating apparatus is disclosed. First, a first electrode and a second electrode are attached onto two sides of a PTC ceramic element respectively through an adhesive material (Step S1501). Next, the PTC ceramic element, the first electrode, and the second electrode are wrapped by a first insulating layer (Step S1502). Then, a first protection layer is attached onto the first electrode with the first insulating layer in between (Step S1503).

Then, a second protection layer is attached onto the second electrode with the first insulating layer in between (Step 1504). Then, the first protection layer and the second protection layer are wrapped by a second insulating layer around (Step S1505). Then, the PTC ceramic element, the first electrode, the second electrode, the first insulating layer, the first protection layer, the second protection layer, and the second insulating layer are placed into a heat conductive housing (Step S1506).

Figure 16:
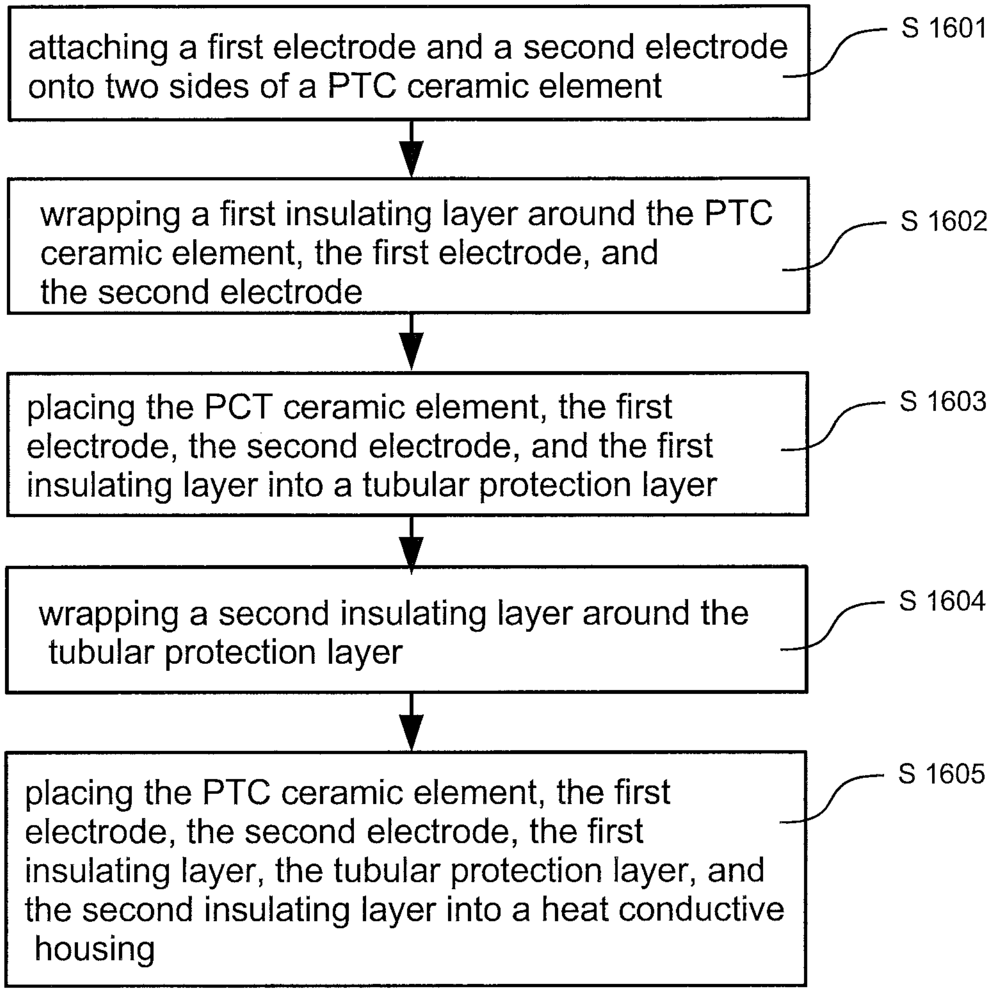
FIG. 16 is a flow char of making a heating apparatus.

FIG. 16 is a flow char of making a heating apparatus. With reference to FIG. 16, another brief version of a method of making a heating apparatus is disclosed. First, a first electrode and a second electrode are attached onto two sides of a PTC ceramic element respectively through an adhesive material (Step S1601). Next, the PTC ceramic element, the first electrode, and the second electrode are wrapped by a first insulating layer (Step S1602).

Then, the PCT ceramic element, the first electrode, the second electrode, and the first insulating layer are placed into a tubular protection layer (Step S1603). Then, the tubular protection layer is wrapped by a second insulating layer (Step S1604). Then, the PTC ceramic element, the first electrode, the second electrode, the first insulating layer, the tubular protection layer, and the second insulating layer are placed into a heat conductive housing (Step S1605).

More detailed steps are explained as follows. With reference to FIG. 11, a method for making a PTC (Positive Temperature Coefficient) heating element is disclosed. First, an adhesive material is applied onto two sides of the PTC ceramic element 106. The first electrode 104 and the second electrode 105 are attached onto the PTC ceramic element 106 through the adhesive material. In some embodiments, the adhesive material comprises silicone thermal conductive material.

In some embodiments, the thermal conductivity of the silicon thermal conductive material is higher than 0.8. The temperature for normal performance of the thermal conductive material can be as high as 250 degree Celsius. In some embodiments, the material of the PTC ceramic element is barium carbonate ($BaCO_3$)

Then, the PTC heating element 106, the first electrode 104, and the second electrode 105 are wrapped with one insulating layer 1107. In some embodiments, the PTC heating element 106, the first electrode 104, and the second electrode 105 are wrapped with multiple insulating layers 1107. In some embodiments, the number of layers of the insulating layers 1107 is 4. Increasing the number of layers of the insulating layers 1107 may provide good insulation effect, but may decrease thermal conductivity.

In some embodiments, the insulating layers 1107 comprises polymer. In some embodiments, the polymer is polyimide. In some embodiments, the insulating layer can have an adhesive layer on the backside. In some embodiments, the adhesive layer is tetraoxyethylene or propylene oxide.

Then, a first protection layer 1101 is attached onto the first electrode 104 with the insulating layers 1107 in between. A second protection layer 1102 is attached onto the second electrode 105 with the insulating layers 1107 in between. In some embodiments, the first protection layer 1101 can cover the first electrode 104. The second protection layer 1102 can cover the second electrode 105.

Then, the first protection layer 1101 and the second protection layer are wrapped by a second insulating layer 1108. In some embodiments, the first protection layer 1101 and the second protection layer are wrapped by a plurality of second insulating layers 1108. In some embodiments, the number of layers of the second insulating layers 1108 is 2. Increasing the number of layers of the insulating layers 1108 may provide good insulation effect, but may decrease thermal conductivity. In this case, the PTC ceramic element 1106, the first electrode 1104, the second electrode 1105, the first protection layer 1101, and the second protection layer 1102 are all wrapped by the second insulating layers 1108.

In some embodiments, the protection layer 1101 and the protection layer 1102 can contain aluminium, stainless steel, or copper. Aluminium and copper have similar thermal conductivity. Stainless steel is the most expensive compared with the other two materials.

The first insulating layers 1107 and the second insulating layers 1108 can be implemented using only one continuous insulating sheet. In some embodiments, the first insulating layers 1107 are formed using a first continuous insulating sheet and the second insulating layers 1108 are formed using a second continuous insulating sheet. That is, one continuous sheet is used to wrap and form the first set of insulating layers 1107 and another continuous sheet is used to wrap and form the second set of insulating layers 1108. Then, the first set of insulating layers 1107 and the second set of insulating layers 1108 are sealed by heat sealing at two ends.

It is noted that the heat sealing step of the insulating layers is needed only when the insulating layers contain adhesive layers on the backside. The temperature for heat sealing is about 400 degree Celsius, the pressure is about two kilograms, and the time needed is about 5 to 8 seconds.

Then, the PTC ceramic element 1106, the first electrode 1104, the second electrode 1105, the first set of insulating layers 107, and the second set of insulating layers 108 are all placed into a heat conductive housing 1103. Two rubber stoppers are plugged into two openings of the heat conductive housing 1103 respectively. Then the heat conductive housing 1103 is pressed from the top and the bottom sides.

In some embodiments, there are multiple pressing steps. In some embodiments, the heat conductive housing 1103 is turned 90 degrees after the first pressing and the same pressing step is applied again. In some embodiments, the turning step and pressing are repeated 4 times. The pressing step makes the heat conductive housing 1103, the the PTC ceramic element 1106, the first electrode 1104, the second electrode 1105, the first set of insulating layers 107, and the second set of insulating layers 108 coupled tight.

Figure 14:
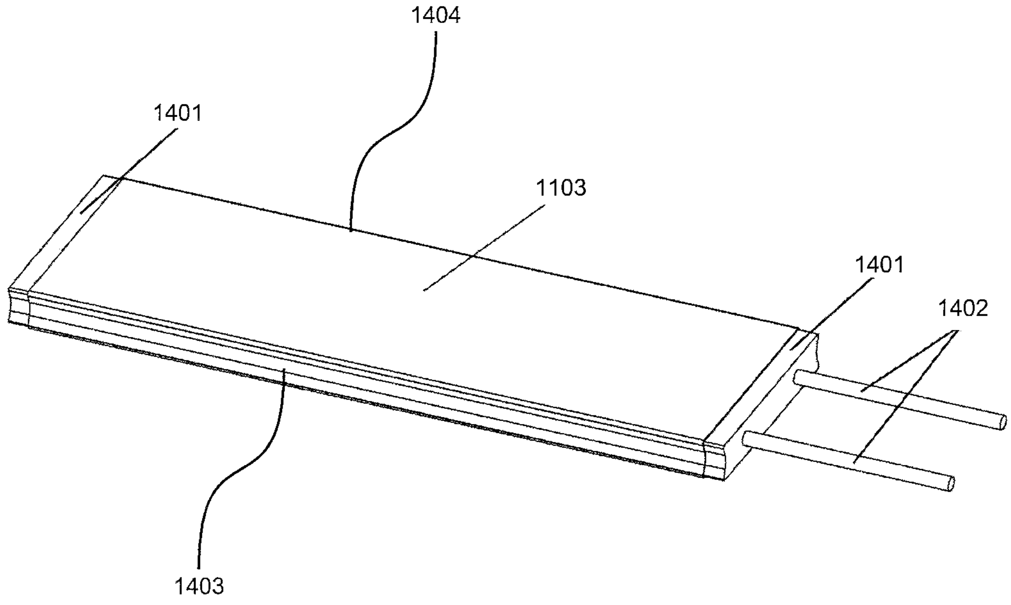
FIG. 14 shows an embodiment of a heat conductive housing.

FIG. 14 shows an embodiment of a heat conductive housing. With reference to FIG. 14, in some embodiments, a first side wall 1403 and a second side wall 1404 of the heat conductive housing 1103 are inwardly curved. When the heat conductive housing 1103 is pressed, the inward curving side walls 1403 and 1404 are squeezed and bent even more inwardly. The characteristic is helpful to the pressing step since it can help make the entire PTC heating element more tight and secure.

In some embodiments, an insulating material 1401 is filled into the openings of the heat conductive housing 1103. In some embodiments, the insulating material 1401 is rubber. In some embodiments, the insulating material 1401 is polymer. In some embodiments, the insulating material 1401 is epoxy. In some embodiments, at least two electrical lines 1402 are extended out of the heat conductive housing 1103.

The insulating material 1401 is filled into the two openings of the heat conductive housing 1103. The insulating material 1401 can be silicone rubber or epoxy. Then, the heat conductive housing 1103 is put under an electrical dry-heat process with 230 volt for 2 hours to solidify the adhesive material applied onto the PTC ceramic element 106.

In some embodiments, a tubular shape protection layer 1201 is used. With reference to FIG. 12, the manufacturing steps are mostly similar to those used for making a flat shape protection layer 1101 and protection layer 1102. After the PTC ceramic element 1106, the first electrode 1104, the second electrode 1105 are placed into the protection layer 1201, the protection layer 1201 is wrapped by a second set of insulating layers 1108. In some embodiments, the number of layers of the insulating layers 1108 is 2 or 3. The tubular shape protection layer 1201 can have a closed side wall or a disconnected side wall. The closed side wall has an O-shape cross-sectional view. The disconnected side wall has a C-shape cross-sectional view.

Another method for forming a flat shape protection layer 1101 or 1102 is disclosed. An insulating film is attached onto a metal layer to form a composite film through an adhesive. In some embodiments, the attaching step is conducted by a dry-heat process. Then, the composite file is cut into smaller pieces for use.

A method for forming a tubular shape protection layer 1201 is disclosed. An insulating film is attached onto a metal layer to form a composite film through an adhesive. In some embodiments, the attaching step is conducted by a dry-heat process. Then, the composite film is cut into smaller pieces for use. Then, the composite film is bent to form the tubular shape protection layer.

A method for making a heating unit is disclosed. With reference to FIG. 2, a PTC heating element 2 is placed into a duct 11 of a heat conductor 1. The heat conductor 1 is then pressed so that an inner surface of the duct is tightly attached to the PTC heating element 2. A first end cover 3 and a second end cover 4 are coupled fixedly to the heat conductor 1.

Figure 17:
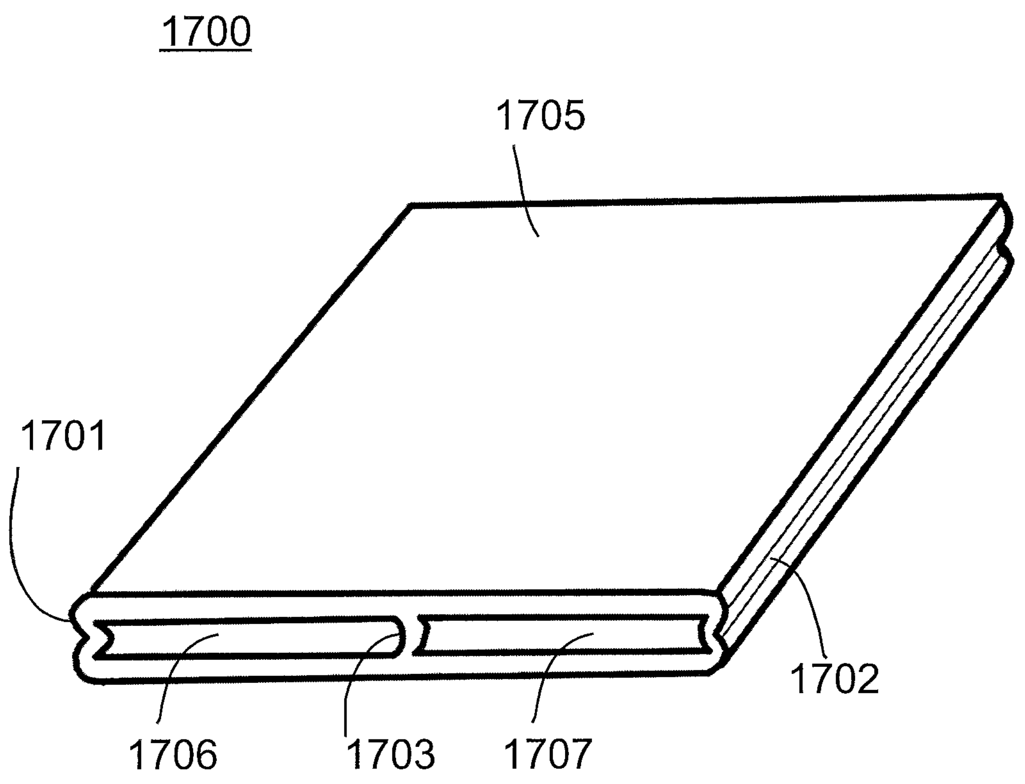
FIG. 17 shows another embodiment of a heating apparatus.

FIG. 17 shows another embodiment of a heating apparatus. Referring to FIG. 17, the heating apparatus 1700 comprises a heat conductive housing 1705. The heat conductive housing 1705 has a first side wall 1701 and a second side wall 1702. In some embodiments, the first side wall 1701 is inwardly curved and the second side wall 1702 is inwardly curved. In some embodiments, the heat conductive housing 1705 comprises a middle wall 1703. The middle wall 1703 is bent and has a curve.

The heat conductive housing 1705 has a first opening 1706 and a second opening 1707. In some embodiments, an insulating material is filled into the first opening 1706 and the second opening 1707. The insulating material can be epoxy, polyimide, silicone, or rubber. The bent middle wall 1703, the inwardly curved first side wall 1701, and inwardly curved second side wall 1702 can help to press the inner structure of the heat conductive housing 1705 so that the inner structure becomes more tight and secure.

Figure 18:
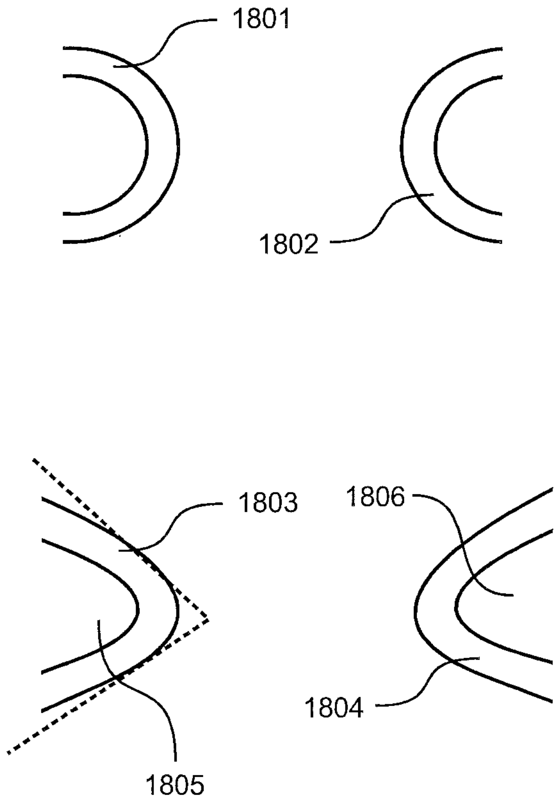
FIG. 18 shows different shapes of side walls and middle wall.

FIG. 18 shows different shapes of side walls and middle wall. Referring to FIG. 17 and FIG. 18, the side wall 1701 can be an C shape 1801 or an L shape 1803. The side wall 1702 can be an C shape 1802 or an L shape 1804. The middle wall 1703 can be one of the C shape 1801, the C shape 1802, the L shape 1803, and the L shape 1804. In some embodiments, the middle wall 1703 is bent, and the bending angle 1805 or 1806 is between 60 degree and 160 degree.

In some preferred heating apparatus embodiments, the heating apparatuses are supplied with more than 3000 voltage to detect hidden flaw products. For example, a voltage more than 3500 voltage with 5 mA~10 mA is applied to the heating apparatus for 60 seconds. In other words, such standard may be used for selecting configuration of elements for constructing a preferred heating apparatus.

In some preferred heating apparatus embodiments, the power consumed by the heating apparatus may be configured between 1500 W to 2500 W, or between 1800 W to 2200 W more specifically.

The present invention has been described above in connection with example implementations which, however, are not intended to be limiting to the scope of the present invention, and any person skilled in the art could make possible changes and modifications without departing from the spirit and scope of the present invention. Hence, any alteration, equivalent change and modification which are made to the above-mentioned examples in accordance with the technical substance of the present invention and without departing from the spirit of the present invention, would fall within the scope defined by the claims of the present invention.

What is claimed is:

1. A heating unit comprising:

a heat conductor comprising a liquid passage channel formed in a lengthwise direction through the heat conductor, and a duct formed in the lengthwise direction through the heat conductor;

a positive temperature coefficient (PTC) heating element disposed within the duct, at least a first end of the PTC heating element being coplanar with a first end of the heat conductor;

an end cover coupled to the first end of the heat conductor; and a sealing gasket disposed around an opening of the duct between the end cover and the first end of the heat conductor.

2. The heating unit of claim 1, the end cover comprising an internal passage in communication with the liquid passage channel.

3. The heating unit of claim 1, the end cover being a first end cover and the heating unit further comprising a second end cover coupled to a second end of the heat conductor.

4. The heating unit of claim 3, the sealing gasket being a first sealing gasket and the heating unit further comprising a second sealing gasket disposed between the second end cover and the second end of the heat conductor.

5. The heating unit of claim 1, the liquid passage channel being a first liquid passage channel and the heating unit further comprising a second liquid passage channel formed in the lengthwise direction through the heat conductor, the duct disposed between the first liquid passage channel and the second liquid passage channel.

6. A heating unit comprising:

a heat conductor comprising a liquid passage channel formed through the heat conductor, and a duct formed through the heat conductor;

a positive temperature coefficient (PTC) heating element comprising a first portion disposed within the duct and a second portion extending from the duct at a first end of the heat conductor, both the first portion of the PTC heating element and the second portion of the PTC heating element configured to generate heat; and an end cover coupled to the first end of the heat conductor and comprising a space therein configured to accommodate the second portion of the PTC heating element.

7. The heating unit of claim 6, the end cover further comprising an internal passage in communication with the liquid passage channel.

8. The heating unit of claim 6, the end cover being a first end cover and the heating unit further comprising a second end cover coupled to a second end of the heat conductor.

9. The heating unit of claim 8, further comprising a first sealing gasket disposed between the first end cover and the first end of the heat conductor and a second sealing gasket disposed between the second end cover and the second end of the heat conductor.

10. The heating unit of claim 6, the liquid passage channel being a first liquid passage channel and the heating unit further comprising a second liquid passage channel, the duct being disposed between the first liquid passage channel and the second liquid passage channel.

11. A heating unit comprising:

a heat conductor comprising a liquid passage channel formed through the heat conductor, and a duct formed through the heat conductor;

a positive temperature coefficient (PTC) heating element disposed within the duct and configured to generate heat;

an end cover coupled to a first end of the heat conductor; and a sealing gasket disposed around an opening of the duct between the end cover and the first end of the heat conductor.

12. The heating unit of claim 11, the end cover being a first end cover and the sealing gasket being a first sealing gasket, the heating unit further comprising:

a second end cover coupled to a second end of the heat conductor; and a second sealing gasket disposed around an opening of the duct between the second end cover and the second end of the heat conductor.

13. The heating unit of claim 12, the first end cover and the second end cover each comprising an internal passage in communication with the liquid passage channel.

14. The heating unit of claim 12, wherein one of the first end cover and the second end cover further comprises an opening therethrough configured to enable electrical connection between the PTC heating element and an external element.

15. The heating unit of claim 11 wherein the liquid passage channel comprises a plurality of liquid passage channels formed through the heat conductor.

16. A heating unit comprising:

a heat conductor comprising a liquid passage channel formed in a lengthwise direction through the heat conductor, and a duct formed in the lengthwise direction through the heat conductor;

a positive temperature coefficient (PTC) heating element disposed within the duct; and an end cover coupled to a first end of the heat conductor and comprising a groove therein configured to accommodate a portion of the PTC heating element extending from the first end of the heat conductor;

wherein the groove extends in a direction substantially orthogonal to the lengthwise direction and is in communication with a space external to the heat conductor.

* * * * *